ations of the ground on which the tractor travels in respect to the ground along the highway.

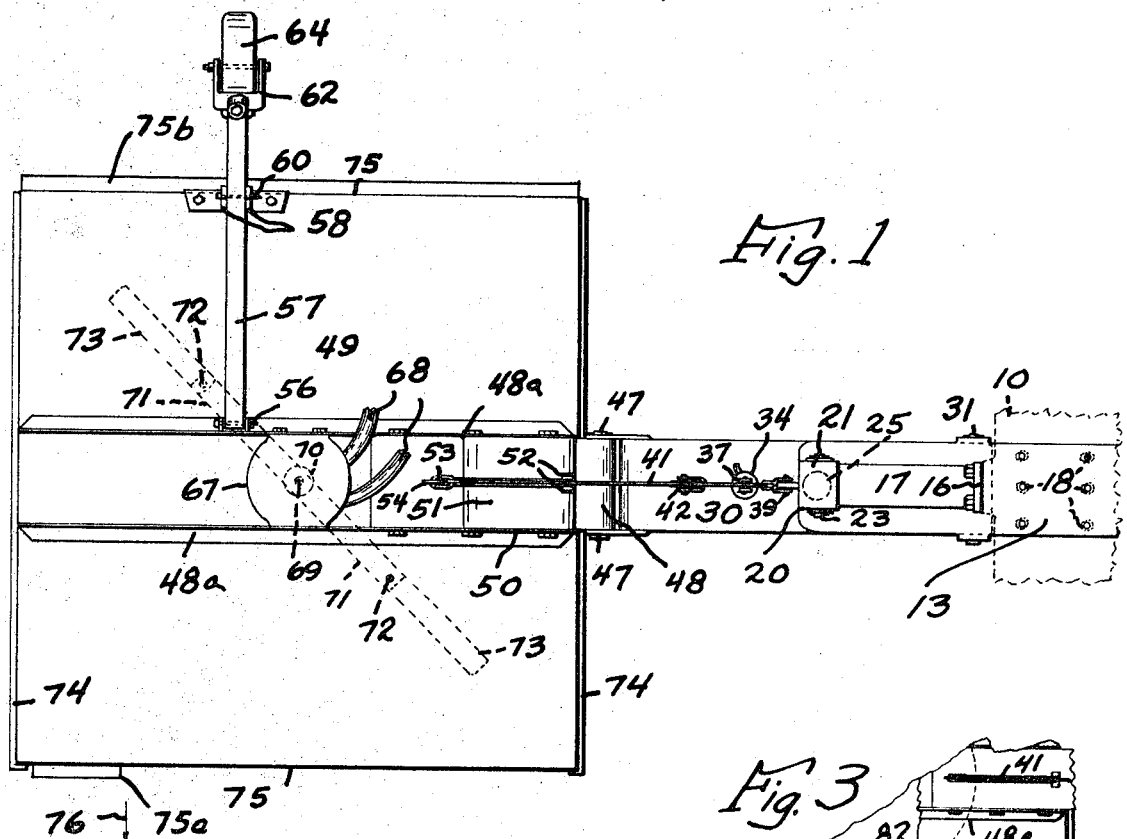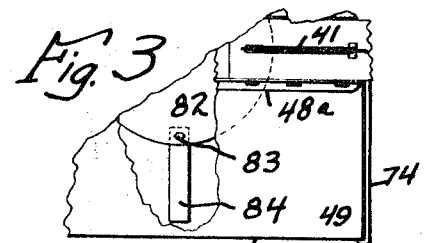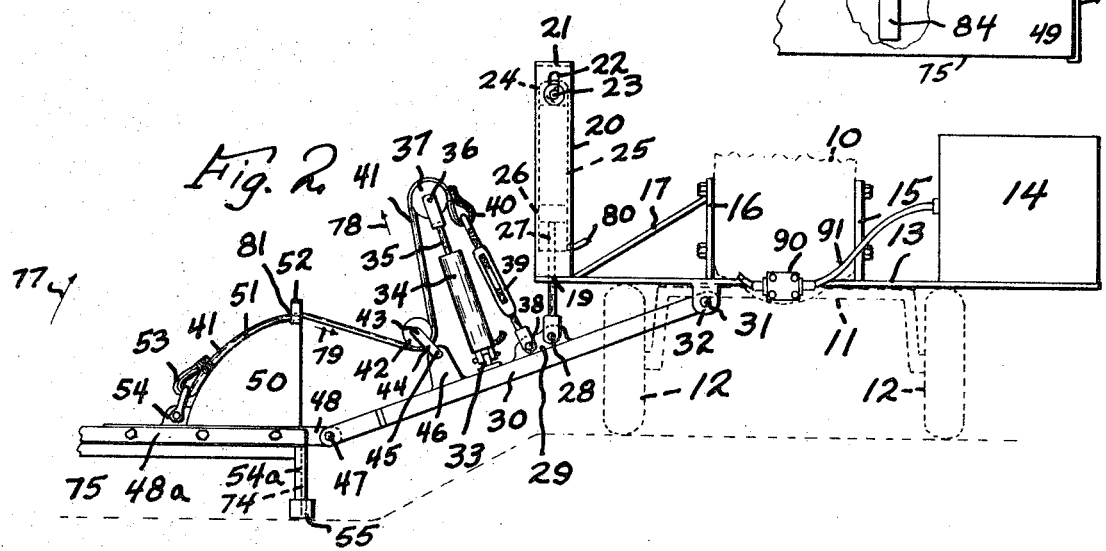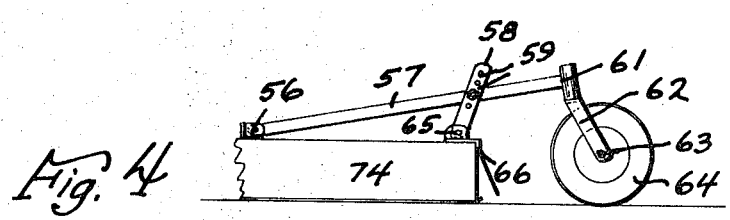

United States Patent Office
3,553,946
TRACTOR MOUNTED ADJUSTABLE ROTARY HIGHWAY MOWER Sam S. Taylor and Roger W. Lunstra, Sioux Falls, S. Dak., assignors to Sam Taylor Equipment, Sioux Falls, S. Dak., a corporation of South Dakota
Filed Oct. 10, 1968, Ser. No. 766,443
Int. Cl. A01d 35/26, 35/28
U.S. Cl. 56—25.4     4 Claims

ABSTRACT OF THE DISCLOSURE

A tractor mounted adjustable rotary highway mower having extending articulated arms, with hydraulic means for adjustably varying the angle of said arms with respect to each other, and with an end arm having a rotary cutter mounted thereon.

---

A side mounted tractor mower normally involves the conventional belt or chain drive for operating the cutting blade. This type of drive mechanism is subject to breakage and failure and presents maintenance high costs.

The mower of this invention is completely hydraulically operated and includes a hydraulic motor for driving the cutting blade at speeds of 1250 r.p.m.'s. Two remote and independently operable cylinders are provided for moving the cutting blade through a 150 degree vertical arc which makes it possible to cut in any position between the vertical down to 60 degrees below the horizontal.

A power take-off drive is mounted on the tractor front in line with the crank shaft and thus eliminates chains, shafts, clutch universal or V-belts. A reservoir tank for the hydraulic drive is mounted on the tractor side opposite the mower and acts as a counterbalance. The hydraulic drive mechanism and the adjustment mechanism makes it possible to reach the mower up and keep fence lines clean while the tractor rides on the level ground down below or the mower can be positioned downwardly along steep embankments while the tractor is kept on the level ground at a safe angle.

These and other features and advantages of this invention will become readily apparent to those skilled in the art upon reference to the following description when taken into consideration with the accompanying drawings, wherein:

FIG. 1 is a fragmentary plan view of the tractor mounted adjustable rotary highway mower of this invention;

FIG. 2 is a side elevation of the tractor mounted adjustable rotary highway mower;

FIG. 3 is a fragmentary view of an alternate cutting blade arrangement; and

FIG. 4 is a side elevation of the mower and the depth gauge wheel.

The highway mower of this invention is shown in the drawings mounted on a tractor 10 having a framework 11 and forward wheels 12. The mower structure includes a flat member 13 to which is attached an oil reservoir 14 adapted to provide the hydraulic oil supply for the mechanism to be described. A pair of upstanding support mounting brackets 15 and 16 are provided on the flat member 13 for detachable engagement with opposite sides of the tractor 10. A brace 17 extends from the bracket 16 and engages the outer end of the flat member 13 adjacent the mower unit.

As seen in FIG. 1 the cross support member 13 can be attached to the tractor framework 11 by means of suitable bolts 18 or in any other manner. Secured at 19 to one end of the member 13 is the substantially U-shaped member 20 having the top portion 21, each side of the member 20 including the short vertical slots 22 therein which receive a transverse pin 23 which is secured to the upper end 24 of a hydraulic piston 25 which carries the piston 26 which in turn is attached to a piston rod 27.

The piston rod 27 is pivotally connected at 28 to a plate 29 carried on a substantially rectangular in cross-section arm member 30 which is pivoted at 31 to suitable ears 32 secured to the member 13. A further hydraulic cylinder 34 is secured to the member 30 at 33 and includes a suitable piston therein attached to the piston rod 35, to which a pulley 37 is journaled at 36. A turnbuckle member 39 is pivoted at 38 to the member 29 and is secured at 40 to a cable 41 which passes over the pulleys 37 and which then passes beneath a tension pulley 42 which is journaled at 43 to the links 44 which are pivoted at 45 to a member 46, which member is attached to the arm member 30. A link member 48 is pivoted at 47 to the arm member 30 and is attached to angle members 48a and to the top wall 49 of the cutting member, and also attached to the top wall 49 is a quarter pie-shaped member 50 having an arcuate surface 51. A pair of cable guide retainers 52 are affixed to the lever member 50. The cable 41 passes between the guide retainers 52 and then is attached at 53 to the member 54 which is secured to the top wall of the cutting unit. A support 54a extends from one side of the cutter member and has a skid 55 attached thereto. A bar 57 is attached at 56 to one of the angle members 48 (also see FIG. 4) and is received between the further bars 58 having the openings 59 therein, and received in the openings 59 is a pin 60 which also passes through the bar 57 and attached at 61 to the bar 57 is the frame 62 to which is journaled at 63, a depth gauge wheel 64. The bars 58 are pivoted at 65 to the member 66 which is attached to the wall 49.

A hydraulic motor 67 includes hydraulic tubes or hoses 68. A shaft 69 is secured to a hub 70 to which is secured radially positioned arms 71, to which are pivotally mounted at 72 cutting blades 73. The cutting member casing includes side portions 74, the ends 75 of the casing being open except for a pivotal flashing 75a on the outer end of the forward side and a pivotal gate 75b along the rear ends.

A power take-off drive 90 is mounted on the front of the tractor 10 as seen in FIG. 2 in line with the tractor crankshaft. The reservoir tank 14 is connected through a hose 91 to the drive pump 90. The hydraulic motor 67 and the cylinders 25 and 34 are each independently controlled but are all operated by the power take-off drive pump 90.

In operation the cutter bars 73 are rotated by means of the hydraulic motor 67 and can be raised or positioned at any angle or height desired by means of the above described arrangement as follows.

For instance, FIG. 2 illustrates the use of the tractor, traveling along the highway in the direction indicated at 76 by the arrow at a certain preset position of the various members. For pivoting the casing in the direction of the arrow 77, the hydraulic oil is forced into the cylinder 34 which will cause the piston rod 35 to raise in the direction of the arrow 78 which will correspondingly draw the cable 41 in the direction of the arrow 79 thereby causing the cutter casing to pivot in the direction 77, and in this way the casing can be positioned at any angle to cut at any slope desired. The skid 55 in cooperation with the ground depth gauge wheel 64 provides support for the unit. The wheel 64 can be adjustably positioned by appropriately positioning the pins 60 for supporting the cutting member at a desired height. For raising the unit, the oil is fed to the tube 80 which oil passes into the cylinder 25 which causes the piston 26 to rise thereby raising the casing and cutter at 28, and in this way through the raising and lowering action, the mower can be positioned at desired elevations according to the contour, and the cutter can be placed at any angular position desired, so that in effect, the device will accommodate various slopes, etc. The quarter pie-shaped lever member 50 permits the cable 41 to pull at substantially the point 81 and thereby providing a greater leverage and easier raising action due to the curved surface 51. As the device travels forwardly, the grass and the like will be discharged through open end 75 and the flow therethrough may be controlled by the gate 75b.

The slots 22 in the sides of the member 20 provide a lost motion connection between the arm and the cylinder 25 to permit a freer upward and downward movement of the mechanism at any preset position so that the device will ride freely over the ground and the like. The turnbuckle 39 permits further adjustment when desired.

FIG. 3 illustrates a modification of this type of cutter with identical reference numerals indicating identical parts, however in this modification a disc 82 is provided to which are pivoted at 83 the cutter blades 84. The disc prevents rocks and stones and the like from passing through the hub portion 70 attached to the shaft 69, thereby preventing any damage to the hub portion. Additionally, the large steel center disc develops a substantial amount of inertia which helps maintain the momentum of the rotational movement at speeds of 1250 r.p.m.'s if desired.

Some changes may be made in the construction and arrangement of our tractor mounted adjustable rotary highway mower without departing from the real spirit and purpose of our invention, and it is our intention to cover by our claims, any modified forms of structure or use of mechanical equivalents which may be reasonably included within their scope.

We claim:

1. A tractor mounted adjustable rotary mower comprising:
   a tractor-attached framework, an arm pivotally attached at one end to said framework and extending outwardly therefrom,
   a first hydraulic cylinder means operatively connected to said arm for pivoting said arm to a selected position,
   a cutting member pivotally attached to the other end of said arm, a second hydraulic cylinder means operatively connected to said cutting member for pivoting said cutting member with respect to said arm and said framework,
   said first hydraulic cylinder means including means permitting said arm to freely move up and down within limits as the cutting member follows the contour of the ground during the cutting operation.

2. The mower of claim 1 wherein said means permitting said arm to freely move comprises a lost motion connection between said first hydraulic cylinder means and said framework, said first hydraulic cylinder means being substantially vertically disposed, the upper end of said first hydraulic cylinder being vertically movably secured to said framework to provide said lost motion connection.

3. The mower of claim 1 wherein an upstanding member is secured to said cutting member, said upstanding member being substantially quadrant shaped, a cable secured at one end to said cutting member at the lower end of said upstanding member and extending upwardly thereover towards said framework, a tension pulley on said arm between said upstanding member and said second hydraulic cylinder means, said second hydraulic cylinder means being secured at its lower end to said arm and having an upwardly extending piston rod with a pulley mounted thereon, said cable extending beneath said tension pulley and over said pulley on said second hydraulic cylinder means, the other end of said cable being operatively secured to said arm, the extension of the piston rod of said second hydraulic cylinder means causing said cable to pivotally raise said cutting member with respect to said arm.

4. The mower of claim 3 wherein said upstanding member provides a lever arm for pivoting said cutting member, said first and second hydraulic cylinders being positioned in an upstanding side by side relationship on said arm, said tension pulley being positioned with respect to said upstanding member and said second hydraulic cylinder means so as to maintain said cable in engagement with said upstanding member during the initial upward pivotal movement of said cutting member with respect to said arm.

References Cited

UNITED STATES PATENTS

| | | | |
|---|---|---|---|
| 2,982,080 | 5/1961 | Martin | 56—6 |
| 3,045,413 | 7/1962 | Sheffer | 56—25.4 |
| 3,063,225 | 11/1962 | Barrentine | 56—6 |
| 3,115,738 | 12/1963 | Engler | 56—6 |
| 3,221,482 | 12/1965 | Cowling | 56—25.4 |
| 3,320,732 | 5/1967 | Kirk | 56—295 |

LOUIS G. MANCENE, Primary Examiner

J. N. ESKOVITZ, Assistant Examiner